Dec. 14, 1965 J. L. OOMS 3,223,789
AUTOMATIC CONTROL OF GROOVE SPACING IN PHONOGRAPH RECORDS
Filed May 10, 1962
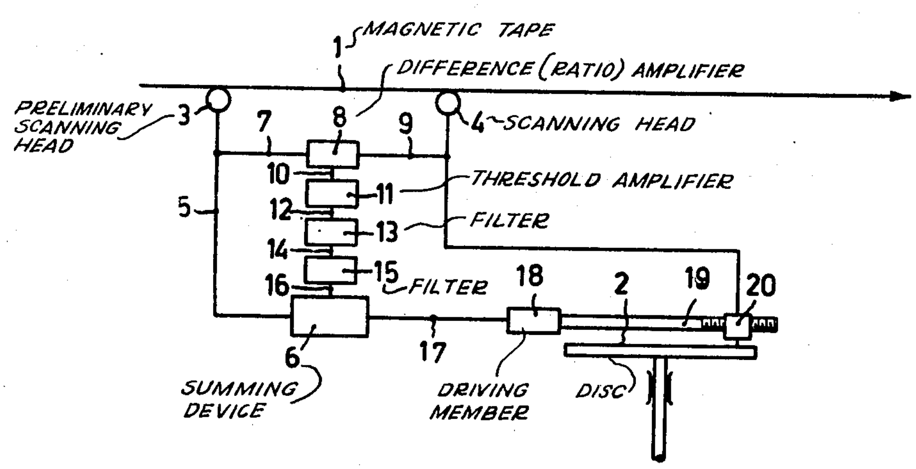
INVENTOR
JOHAN L. OOMS
BY
AGENT

United States Patent Office 3,223,789

Patented Dec. 14, 1965

3,223,789

AUTOMATIC CONTROL OF GROOVE SPACING IN PHONOGRAPH RECORDS

Johan Lodewijk Ooms, Baarn, Netherlands, assignor to North American Philips Company, Inc., New York, N.Y., a corporation of Delaware Filed May 10, 1962, Ser. No. 193,755
Claims priority, application Netherlands, May 16, 1961, 264,825
5 Claims. (Cl. 179—100.4)

This invention relates to apparatus for producing grooved phonograph records and in particular to improved apparatus for the automatic control of the groove spacing of such records.

It is known in the prior art to read the signal to be cut into the record disc from a moving tape-shaped carrier by means of a pick-up head, and to derive a control voltage for the driving member of the cutting head from a preliminary pick-up head; the control head determines the groove spacing.

The purpose of the control voltage is to allow an economical use of the space on the disc by controlling the groove spacing in accordance with the amplitude of the signal to be cut. However, it has been found that the devices in use do not eliminate the so-called groove echo and, in fact, at times tend to increase the groove echo.

The invention is based on the recognition of the fact that, in order to avoid groove echo, the spacing between the grooves must be increased when two signals having a high difference in amplitude are to be cut in adjacent grooves. The groove echo generally becomes troublesome when a groove in which a weak signal is recorded, is preceded or followed by a groove in which a strong signal is recorded. If a groove having a strong signal is directly followed by a groove which is read by the preliminary scanning head as also having to register a strong signal, the groove spacing can be maintained at the normal value or be brought to this value. However, if the preliminary pick-up head senses the arrival of a relatively weak signal, the groove distance must be increased or held at the already increased value (if a groove having a low signal preceded the groove having the strong signal).

According to one aspect of the invention, therefore, the control-voltage for the driving member of the cutting head, which determines the groove distance, is determined at any instant by the instantaneous ratio between the readings of the pick-up head and of the preliminary pick-up head. In accordance with another aspect of the invention the control-voltage is held at the value associated with the normally desired groove spacing as long as the said ratio does not exceed a given value, for instance 3:1.

In accordance with the invention a voltage difference can be derived from the readings of the pick-up head and of the preliminary pick-up head, and this difference voltage is only fed to the driving member of the cutting head when a given threshold value is exceeded.

The current fed to the said driving member under the action of the transmitted difference voltage can be passed, in accordance with the invention, through a frequency-sensitive filter having a frequency curve reciprocal to the frequency-curve of the ear and also if desired, through a member which passes substantial currents having a given frequency, for instance, those lying between 1000 c./s. and 3000 c./s., but attenuates currents of other frequencies.

The invention will now be described more fully with reference to the single figure of the drawing, which shows a block diagram of a preferred embodiment.

As shown in the drawing, a magnetic tape 1, on which is registered the signal to be recorded on a disc 2, is moved along a preliminary pick-up head 3 in the direction of the arrow; the latter follows, at a given distance, a pick-up head 4. The distance between the heads 3 and 4 is chosen so that it is covered by each point of the tape within the time in which the disc 2 performs half to a complete revolution.

The preliminary pick-up head 3 is connected via a conductor 5 to a device 6, the purpose and operation of which will be described more fully hereinafter. The preliminary pick-up head 3 and the pick-up head 4 are connected, by means of conductors 7 and 9 respectively, to a device 8, which derives a difference voltage from the signals obtained from heads 3 and 4; this difference voltage is fed via a conductor 10 to a threshold amplifier 11, which feeds a voltage via the conductor 12 to an audio frequency filter 13 when the voltage from 8 exceeds a given threshold value of the ratio of the signals from heads 3 and 4. In this filter 13 the signal from threshold amplifier 11 is "weighted" in accordance with the sensitivity of the human ear as a function of the sound pressure. Each groove echo will as a rule produce only a weak, barely audible sound impression, which is less troublesome with a low sensitivity level and for low and high frequencies than for medium frequencies. This can be taken into consideration by providing the filter 13 with a frequency curve which is reciprocal to that of the ear.

The signals filtered by 13 then travel by means of conductor 14 through another audio frequency filter 15 which has a frequency curve such that those frequencies which give rise, in the cutting process, to the strongest groove echo as a result of the physical co-operation between the chisel and the lacquer, for example the frequencies lying between 1000 c./s. and 3000 c./s., are passed unattenuated via a conductor 16 to the device 6, while the less critical frequencies are suitably attenuated.

In the device 6 the signal from filter 15 is converted, together with the signal directly received from the preliminary pick-up head 3, into a control-voltage which is fed via a conductor 17 to the driving member 18, which controls, through a screw spindle 19, the radially inward movement of the writing head 20 and hence the distance between the grooves.

The device 6 may also be a direct-current amplifier supplying a current to a braking-system incorporated in driving member 18, which current is a function of the sum of the voltages from the conductors 5 and 16.

Alternatively it is possible to derive a frequency variation proportional to the difference of the voltages of 5 and 16, which may be supplied as a variable frequency current to a synchronous motor 18 via the conductor 17.

While the invention has been described with reference to a specific embodiment, it is to be understood that various modifications thereof will readily occur to a person skilled in the art without departing from the inventive concept, the scope of which is set forth in the appended claims.

What is claimed is:

1. Apparatus for the automatic control of the groove spacing in phonograph records comprising: a moving carrier in which the signal to be cut into a phonograph record is recorded, a pick-up head for reading said signal from said carrier, a preliminary pick-up head for reading said signal prior in time to said scanning head, means for obtaining the instantaneous ratio between the output signals of said two pick-up heads, means for applying said ratio and the output signal of the preliminary pick-up head to deriving means for deriving a control voltage having a value dependent on said ratio and the output signal of the preliminary pick-up head, a cutting head for said record, a driving member for said cutting head, and means for applying said control voltage to said driving member.

2. Apparatus for the automatic control of the groove spacing in phonograph records, comprising: a moving carrier in which the signal to be cut into a phonograph record is recorded, a pickup head for reading said signal from said carrier, a preliminary pick-up head for reading said signal prior in time to said scanning head, means for obtaining the instantaneous ratio between the output signals of said two pick-up heads, means for applying said ratio and the output signal of the preliminary pick-up head to deriving means for deriving a control voltage having a value dependent on said ratio and the output signal of the preliminary pick-up head, means for maintaining said control voltage at a predetermined value and for causing said control voltage to change from said value when said ratio exceeds said predetermined value, a cutting head, a driving member for said cutting head, and means for applying said control voltage to said driving member.

3. Apparatus for the automatic control of the groove spacing in phonograph records, comprising: a moving carrier in which the signal to be cut into a phonograph record is recorded, a pick-up head for reading said signal from said carrier, a preliminay pick-up head for reading said signal prior in time to said scanning head, means for obtaining the instantaneous ratio between the output signals from said two pick-up heads, said ratio being fed to a threshold device having a predetermined threshold value, means for deriving a control voltage having a value dependent on the output signal of the preliminary pick-up head and the output of said threshold device, a cutting head, a driving member for said cutting head, and means for applying said control voltage to said driving member.

4. Apparatus for the automatic control of the groove spacing in phonograph records, comprising: a moving carrier in which the signal to be cut into a phonograph record is recorded, a pick-up head for reading said signal from said carrier, a preliminary pick-up head for reading said signal from said carrier, a preliminary pick-up for reading said signal prior in time to said scanning head, means for obtaining the instantaneous ratio between the output signals from said two pick-up heads, said ratio being fed to a threshold device having a predetermined threshold value, the output of said threshold device being fed to a frequency-sensitive filter having a frequency curve which is reciprocal to that of the human ear, means for deriving a control voltage having a value dependent on the output signal of the preliminary pick-up head and the output of said filter, a cutting head, a driving member for said cutting head, and means for applying said control voltage to said driving member.

5. Apparatus according to claim 4, wherein the output of said frequency-sensitive filter is fed to a second filter having a filter characteristic such that only frequencies between substantially 1000 cycles/sec. and 3000 cycles/sec. are passed thereby.

References Cited by the Examiner

UNITED STATES PATENTS 3,075,052 1/1963 Terry ---------------- 274—42

IRVING L. SRAGOW, *Primary Examiner.*

EMIL G. ANDERSON, *Examiner.*